United States Patent

Mory et al.

[11] 3,956,266
[45] May 11, 1976

[54] BIS-(BENZIMIDAZOLONE-AZO-ACETOACETYLAMINO)-PHENYLENE PIGMENTS

[75] Inventors: Rudolf Mory, Dornach; Stefan Hari, Allschwil, both of Switzerland

[73] Assignee: Ciba-Geigy Corporation, Ardsley, N.Y.

[22] Filed: Oct. 21, 1974

[21] Appl. No.: 516,528

[30] Foreign Application Priority Data
Oct. 30, 1973  Switzerland...................... 15249/73

[52] U.S. Cl................................... 260/157; 106/23; 106/288 Q; 106/300; 106/308 N; 260/42.21; 260/152; 260/154; 260/155; 260/244 R; 260/247.5 R; 260/251 Q; 260/288 R; 260/309.2; 428/457; 428/518; 428/532; 260/558 A
[51] Int. Cl.²..................... C09B 33/14; D06P 3/00; D06P 3/24; D06P 3/52
[58] Field of Search ............ 260/157, 155, 154, 152

[56] References Cited
UNITED STATES PATENTS 3,109,842  11/1963  Schilling et al. .................... 260/157
3,609,134  9/1971  Mory ................................ 260/152

FOREIGN PATENTS OR APPLICATIONS 103,085  11/1965  Denmark ........................... 260/157
426,053  6/1967  Switzerland........................ 260/155
1,808,017  6/1970  Germany ........................... 260/157

Primary Examiner—Floyd D. Higel
Assistant Examiner—John J. Doll
Attorney, Agent, or Firm—Vincent J. Cavalieri

[57] ABSTRACT

New diazo pigments of the formula

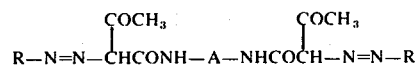

wherein A denotes a phenylene or naphthylene radical and R denotes an aromatic radical containing a —CONH— group bonded in a cyclic structure are prepared. The pigments are useful for coloring high-molecular organic materials such as polyamides, polyurethanes or polyesters. The pigments have good fastness to light, migration and weathering.

1 Claim, No Drawings

BIS-(BENZIMIDAZOLONE-AZO-ACETOACETYLAMINO)-PHENYLENE PIGMENTS

It has been found that new valuable disazo pigments of the formula

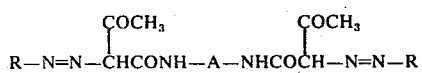

wherein A denotes a phenylene or naphthylene radical and R denotes an aromatic radical containing a —CONH— group bonded in a cyclic structure, are obtained when a diazo or diazoamino compound of an amine of the formula R—NH$_2$ is coupled with a coupling component of the formula

in the molar ratio of 2:1.

Preferred colorants of the formula I are those wherein A denotes a 1,4-phenylene or 1,5-naphthylene radical, it being possible for the phenylene radical additionally to be substituted by halogen atoms or alkyl or alkoxy groups containing 1–4 C atoms, and wherein R denotes an aromatic radical which possesses a 5-membered or 6-membered hetero-ring which contains the group —CONH— as a constituent of the ring.

Particular interest attaches to disazo pigments of the formula

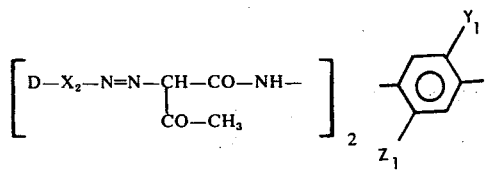

wherein D denotes a ring system of the formula

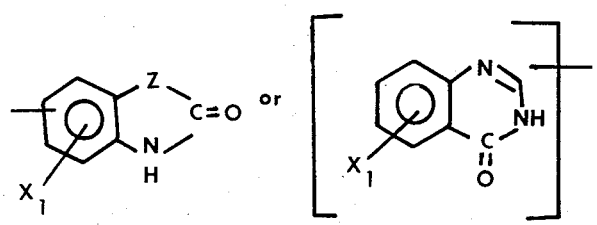

Z denotes a group of the formula —NR$_1$—,

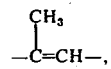

—O—CH$_2$—, —CO—NH—, —NH—CO— or —O—, R$_1$ denotes a H atom, an alkyl group containing 1 to 4 C atoms, a cycloalkyl group, or a phenyl group which is optionally substituted by halogen atoms or alkyl or alkoxy groups containing 1 to 4 C atoms, X$_1$ denotes a H atom, a halogen atom, an alkyl or alkoxy group containing 1 to 4 C atoms or a phenoxy group, X$_2$ denotes a direct bond, a phenylene group or a benzoylamino group, and Y$_1$ and Z$_1$ denote H or halogen atoms or alkyl or alkoxy groups containing 1 to 4 C atoms.

Particularly preferred pigments are those of the formulae

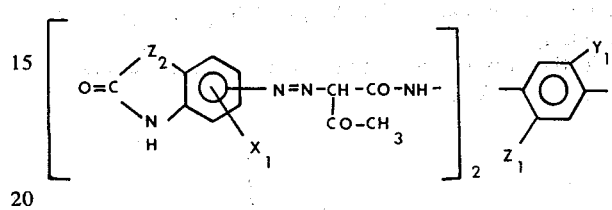

and

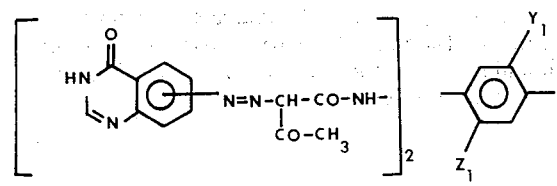

wherein Z$_2$ denotes a group of the formula —NR$_1$—,

or —O—CH$_2$— and X$_1$, Y$_1$, Z$_1$ and R$_1$ have the indicated meaning.

Preferred starting compounds are diazo components of the formula R—NH$_2$, wherein R denotes an aromatic radical which contains a 5-membered or 6-membered hetero-ring which possesses a —CONH— group as a constituent.

Particularly preferred diazo components are those of the formula

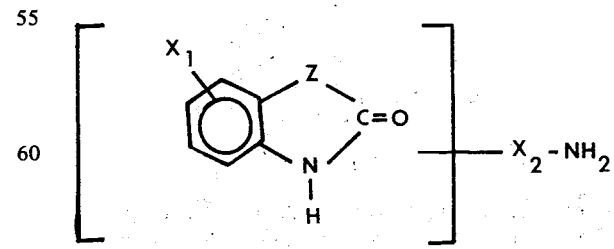

and especially those of the formula

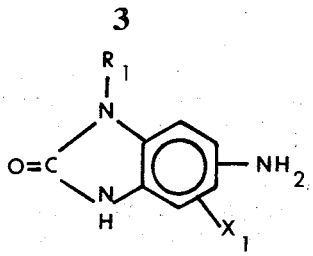

in which formulae $R_1$, $X_1$, $X_2$ and Z have the indicated meaning.

Further diazo components of interest are quinazolones of the formula

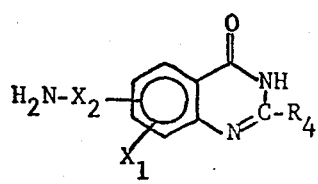

wherein $X_1$ and $X_2$ have the indicated meaning and $R_4$ denotes a H-atom, a hydroxyl group, an alkyl group containing 1–4 carbon atoms or a phenyl group, or those of the formula

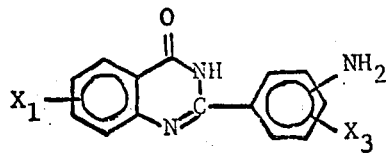

wherein $X_1$ and $X_3$ denote hydrogen or halogen atoms, alkyl or alkoxy groups containing 1–4 carbon atoms, or a phenoxy group, as well as phenmorpholones of the formula

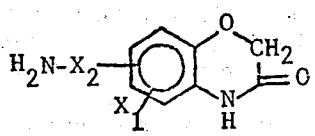

wherein $X_1$ and $X_2$ have the indicated meaning, and also aminequinolones of the formula

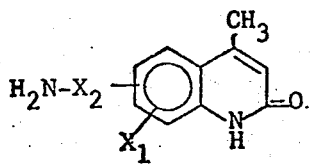

wherein $X_1$ and $X_2$ have the indicated meaning.

The following may be mentioned as examples: 5-amino-benzimidazolone, 5-amino-1-methyl-benzimidazolone, 5-amino-1-n-butyl-benzimidazolone, 5-amino-1-phenyl-benzimidazolone, 5-amino-1-p-chlorophenyl-benzimidazolone, 5-amino-1-p-methylphenyl-benzimidazolone, 5-amino-1-p-methoxyphenyl-benzimidazolone, 5-amino-1-p-acetylaminophenyl-benzimidazolone, 5-amino-6-chloro-benzimidazolone, 5-amino-1-ethyl-benzimidazolone, 5-amino-1-n-propyl-benzimidazolone, 5-amino-1-isopropyl-benzimidazolone, 5-amino-1-cyclohexyl-benzimidazolone, 5-amino-6-bromo-benzimidazolone, 5-amino-6-methyl-benzimidazolone, 5-amino-6-methoxy-benzimidazolone, 5-amino-6-ethoxy-benzimidazolone, 6-amino-benzoxazolone, 5-amino-benzoxazolone, 6-amino-5-chloro-benzoxazolone, 6-amino-5-methyl-benzoxazolone, 6-amino-quinazolone-4, 6-amino-2-methyl-quinazolone-4, 6-amino-2-methoxy-quinazolone-4, 6-amino-7-chloro-2-methyl-quinazolone-4, 6-amino-2-phenyl-quinazolone-4, 6-amino-2(4'-methoxyphenyl)-quinazolone-4, 6-amino-2(4'-methylphenyl)-quinazolone-4, 7-amino-quinazolone-4, 2-(4'-aminophenyl)-quinazolone-4, 2-(3'-aminophenyl)-quinazolone-4, 2-(4'-amino-3'-methoxyphenyl)-quinazolone-4, 2-(4'-amino-3'-chlorophenyl)-quinazolone-4, 2-(3'-amino-4'-methylphenyl)-quinazolone-4, 2-(3'-amino-4'-chlorophenyl)-quinazolone-4, 6-amino-2, 4-dihydroxyquinazoline, 7-amino-2,4-dihydroxyquinazoline, 7-amino-phenmorpholone-3, 6-amino-phenmorpholone-3, 6-amino-8-chloro-phenmorpholone-3, 7-amino-6-chloro-phenmorpholone-3, 7-amino-6-nitro-phenmorpholone-3, 7-amino-6-methyl-phenmorpholone-3, 7-amino-6-methoxyphenmorpholone-3, 6-amino-4-methyl-quinolone-2, 7 -amino-4,6-dimethyl-quinolone-2, 6-amino-7-chloro-4-methyl-quinolone-2, 7-amino-4-methyl-6methoxy-quinolone-2, 7-amino-6-chloro-4-methyl-quinolone-2, 7-amino-4-methyl-quinolone-2, 7-amino-4,8-dimethyl-quinolone-2, 7-amino-6-phenoxy-4-methyl-quinolone-2, 6-amino-5,8-diethoxy-4-methyl-quinolone-2, 6-amino-7,8-benzo-4-methyl-quinolone-2, 6-amino-2,3-dihydroxyquinoxaline as well as 5-(4'-amino-benzoylamino)-benzimidazolone, 5-(3'-amino-benzoylamino)-benzimidazolone, 5-(3'-amino-4'-chloro-benzoylamino)-benzimidazolone and 5-(3'-amino-4'-methyl-benzoyl-amino)-benzimidazolone.

The diazo components mentioned are known compounds.

The diazotisation is carried out according to known methods.

Particularly preferred coupling components are those of the formula

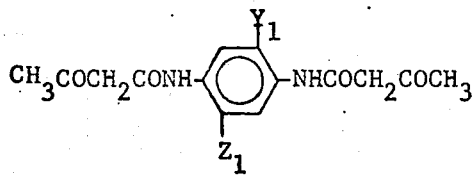

wherein $Y_1$ and $Z_1$ have the indicated meaning.

The coupling component is obtained in a simple manner by the action of diketene or acetoacetic ester on the corresponding diamines, such as, for example: 1,4-phenylenediamine, 2-chloro-1,4-phenylenediamine, 2-methyl-1,4-phenylenediamine, 2-methoxy-1,4-phenylenediamine, 2-ethoxy-1,4-phenylenediamine, 2-propoxy-1,4-phenylenediamine, 2-isopropoxy-1,4-phenylenediamine, 2-butoxy-1,4-phenylenediamine, 2,5-dichloro-1,4-phenylenediamine, 2,5-dibromo-1,4-phenylenediamine, 2,5-dimethyl-1,4-phenylenediamine, 2,5-dimethoxy-1,4-phenylenediamine, 2,5-diethoxy-1,4-phenylenediamine, 2-methoxy-5-ethoxy-1,4- phenylenediamine, 2-methoxy-5-propoxy-1,4-phenylenediamine, 2,5-dipropoxy-1,4-phenylenediamine, 2-chloro-5-methyl-1,4-phenylenediamine, 2-chloro-5-methoxy-1,4-phenylenediamine, 2-chloro-5-ethoxy-1,4-phenylenediamine, 2-methyl-5-methoxy-1,4-phenylenediamine, 2-methyl-5-ethoxy-1,4-phenylenediamine, 2,6-dichloro-1,4-phenylenediamine, 2,3,6-trichloro-1,4-phenylenediamine, 2,3,5,6-tetrachloro-1,4-phenylenediamine, 2,3,5,6-tetramethyl-1,4-phenylenediamine, 1,3-phenylenediamine, 4-chloro-1,3-phenylenediamine, 4-methyl-1,3-phenylenediamine, 4-methoxy-1,3-phenylenediamine, 2,5-dichloro-1,3-phenylenediamine, 4,6-dichloro-1,3-phenylenediamine, 4,6-dimethyl-1,3-phenylenediamine and 1,5-naphthylenediamine.

The coupling preferably takes place in a weakly acid medium, suitably in the presence of customary agents which assist coupling. As such there should in particular be mentioned dispersing agents, for example aralkylsulphonates, such as dodecylbenzenesulphonate, or 1,1'-dinaphthylmethane-2,2'-disulphonic acid or polycondensation products of alkylene oxides. The dispersion of the coupling component can also advantageously contain protective colloids, for example methylcellulose or minor amounts of inert sparingly water-soluble or insoluble organic solvents, for example optionally halogenated or nitrated aromatic hydrocarbons, such as benzene, toluene, xylene, chlorobenzene, dichlorobenzene or nitrobenzene, as well as aliphatic halogenated hydrocarbons, such as, for example, carbon tetrachloride or trichloroethylene, and also water-miscible organic solvents, such as acetone, methyl ethyl ketone, methanol, ethanol or isopropanol or, preferably, dimethylformamide.

The coupling can also be carried out advantageously by continuously combining an acid solution of the diazonium salt with an alkaline solution of the coupling component in a mixing nozzle, whereupon immediate coupling of the components takes place. Care should be taken that the diazo component and the coupling component are present in equimolecular amounts in the mixing nozzle, and it proves advantageous to use a slight excess of the diazo component. This is most simply achieved by control of the pH value of the liquid in the mixing nozzle. Furthermore, vigorous intermixing of the two solutions in the mixing nozzle must be ensured. The resulting colorant dispersion is withdrawn continuously from the mixing nozzle and the colorant is separated off by filtration.

By virtue of their insolubility, the pigments obtained can be isolated from the reaction mixtures by filtration. It proves advantageous to after-treat the resulting pigments with an organic solvent which preferably boils above 100°C. Solvents which prove particularly suitable are benzenes substituted by halogen atoms, alkyl groups or nitro groups, such as xylenes, chlorobenzene, o-dichlorobenzene or nitrobenzene, as well as pyridine bases, such as pyridine, picoline or quinoline, and also ketones, such as cyclohexanone, ethers, such as ethylene glycol monomethyl ether or monoethyl ether, amides, such as dimethylformamide or N-methyl-pyrrolidone, and also sulphoxone.

The after-treatment is preferably carried out by heating the pigment in the solvent to 100° – 150°C, whereupon, in many cases, a coarsening of the particle size occurs, which has a favourable effect on the fastness to light and to migration of the pigments obtained.

The coupling can also be carried out by heating a diazoamino compound of the amine R—NH$_2$ with the diacetoacetylarylenediamine in an organic solvent, optionally in an aqueous-organic solvent, preferably in the presence of an acid.

The diazoamino compounds to be used in accordance with the process are obtained according to known processes by coupling the diazonium salt with a primary amine or preferably with a secondary amine. The most diverse amines are suitable for this purpose, for example aliphatic amines, such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid and $\beta$-aminoethylsulphuric acid, cycloaliphatic amines, such as cyclohexylamine, N-methylcyclohexylamine and dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalenesulphonic acid and 1-aminonaphthalene-2,4-disulphonic acid, heterocyclic amines, such as piperidine, morpholine, pyrrolidine and dihydroindole, and finally also sodium cyanamide or dicyandiamide.

As a rule, the diazoamino compounds obtained are sparingly soluble in cold water and can be isolated from the reaction medium in a crystalline form, if necessary after salting out. In many cases, the moist press cakes can be used for the further reaction. In some cases it can prove advisable to dehydrate the diazoamides, prior to the reaction, by vacuum drying or, after suspending the moist press cake in a solvent, to remove the water by azeotropic distillation.

The coupling of the diazoamino compound with the naphthol takes place in an organic solvent, for example chlorobenzene, o-dichlorobenzene, nitrobenzene, pyridine, ethylene glycol, ethylene glycol monomethyl ether or monoethyl ether, dimethylformamide, N-methylpyrrolidone, formic acid or acetic acid. When using solvents which are water-miscible it is not necessary to use the diazoamino compound in an anhydrous form. For example, the water-moist filter cakes can be used. The splitting of the diazoamino compound which precedes the coupling takes place in an acid medium. If neutral solvents are used, the addition of an acid, for example hydrogen chloride, sulphuric acid, formic acid, acetic acid, chloroacetic acid or propionic acid, is necessary.

The coupling is suitably carried out warm, preferably at temperatures between 80° and 180°C, and in general takes place very rapidly and completely.

Finally, the coupling can also be carried out by suspending the amine together with the coupling component, in the molar ratio of 2:1, in an organic solvent, and treating the mixture with a diazotising agent, especially an ester of nitrous acid, such as methyl nitrite, ethyl nitrite, butyl nitrite, amyl nitrite or octyl nitrite.

The new colorants are valuable pigments which, in a finely divided form, can be used for pigmenting high-molecular organic material, for example cellulose ethers and cellulose esters, high-molecular polyamides and high-molecular polyurethanes or polyesters, acetylcellulose, nitrocellulose, natural resins or synthetic resins, such as polymerisation resins or condensation resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile or polyacrylic acid esters, rubber, casein, silicone and silicone resins, individually or as mixtures.

For such applications, it is immaterial whether the high-molecular compounds mentioned are in the form of plastic masses or melts or in the form of spinning solutions, lacquers, paints or printing inks. Depending on the end use, it proves advantageous to use the new pigments as toners or in the form of preparations.

The preparations can for example contain, in addition to the pure pigment, natural resins, for example abietic acid or its esters, ethylcellulose, cellulose acetobutyrate, alkaline earth metal salts of higher fatty acids, fatty amines, for example stearylamine or rosin amine, vinyl chloride/vinyl acetate copolymers, polyacrylonitrile or polyterpene resins or water-soluble dyestuffs, for example dyestuff-sulphonic acids or their alkaline earth metal salts.

The colorants according to the invention are distinguished by low cost and good fastness to light, migration and weathering. Compared to known disazo pigments which are obtained by coupling isomeric dichloroanilines with bis-acetoacetyl-arylenediamines, they are distinguished by their excellent fastness to weathering.

In the examples which follow, the parts, unless stated otherwise, denote parts by weight and the percentages denote percentages by weight.

EXAMPLE 1

1.63 parts of 1-methyl-5-amino-benzimidazolone in 75 parts by volume of ice water are diazotised with 2.5 parts by volume of concentrated hydrochloric acid and 5 parts by volume of 2 N sodium nitrite solution. 1.52 parts of 1,4-dimethyl-2,5-diacetoacetylamino-benzene are introduced into 100 parts by volume of dimethylformamide. 3.3 parts of anhydrous sodium acetate are also added to the mixture. The diazo solution is then added dropwise over the course of ½ hour at room temperature. The mixture is stirred for some hours longer and the pigment formed is then filtered off, washed with water and methyl alcohol and dried. 2.5 parts of a hard-grained orange powder are obtained. The pigment is brought to a crystalline, soft and tinctorially usable form by brief heating in 100 parts by volume of N-methylpyrrolidone. The pigment colours polyvinyl chloride in a pure and deep yellow shade of very good fastness to migration and good fastness to light. The pigment corresponds to the formula

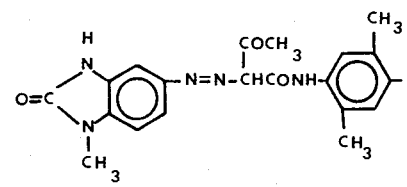

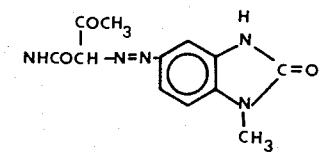

The table which follows describes further colorants which are obtained by coupling the amine listed in column I with the bis-acetoacetic acid arylides of the diamines of of column II. Column III shows the colour shade of a PVC sheet coloured with 0.2% of these pigments.

| No. | I<br>Diazo component | II<br>Bis-acetoacetyl compound of | III |
|---|---|---|---|
| 2 | 4-Methyl-6-chloro-7-aminoquinolone-(2) | 2-Chloro-5-methoxy-1,4-phenylenediamine | Yellow |
| 3 | 4-Methyl-6-amino-7-chloroquinolone-(2) | " | Orange |
| 4 | 2-(4'-Aminophenyl)-quinazolone-(4) | " | Yellow |
| 5 | 4,6-Dimethyl-7-aminoquinolone-(2) | " | Yellow |
| 6 | 5-Amino-6-methoxy-benzimidazolone | " | Orange |
| 7 | 5-Amino-benzimidazolone | " | Yellow |
| 8 | 6-Amino-quinazolone-(4) | " | Yellow |
| 9 | 1-Methyl-5-amino-benzimidazolone | " | Yellow |
| 10 | " | 2-Methoxy-1,4-phenylenediamine | Yellow |
| 11 | " | 2,5-Dichloro-1,4-phenylenediamine | Yellow |
| 12 | " | 2-Chloro-5-methyl-1,4-phenylenediamine | Yellow |
| 13 | " | 2-Chloro-1,4-phenylenediamine | Yellow |
| 14 | 6-Methoxy-7-amino-phenmorpholone-(3) | 2-Chloro-5-methyl-1,4-phenylenediamine | Red-yellow |
| 15 | 6-Methyl-7-amino-phenmorpholone-(3) | " | Yellow |
| 16 | 7-Amino-phenmorpholone-(3) | " | Yellow |
| 17 | 6-Methoxy-7-amino-phenmorpholone-(3) | 2,5-Dichloro-1,4-phenylenediamine | Red-yellow |
| 18 | 6-Chloro-7-amino-phenmorpholone-(3) | " | Green-yellow |
| 19 | 6-Methyl-7-amino-phenmorpholone-(3) | 2,5-Dichloro-1,4-phenylenediamine | Yellow |
| 20 | 7-Amino-phenmorpholone-(3) | " | Yellow |
| 21 | 6-Methoxy-7-amino-phenmorpholone-(3) | " | Orange |
| 22 | 6-Chloro-7-amino-phenmorpholone-(3) | " | Orange |
| 23 | 6-Methyl-7-amino-phenmorpholone-(3) | " | Orange |
| 24 | 7-Amino-phenmorpholone-(3) | " | Yellow |
| 25 | 4-Methyl-7-aminoquinolone-(2) | 1,4-Phenylenediamine | Green-yellow |
| 26 | " | 2-Methoxy-1,4-phenylenediamine | Yellow |
| 27 | " | 2-Chloro-1,4-phenylenediamine | Yellow |
| 28 | " | 1,5-Diaminonaphthalene | Orange |
| 29 | " | 2,5-Dimethyl-1,4-phenylenediamine | Orange |
| 30 | " | 2,5-Dichloro-1,4-phenylenediamine | Green-yellow |
| 31 | " | 2-Chloro-5-methyl-1,4-phenylenediamine | Yellow |
| 32 | " | 2-chloro-5-methoxy-1,4-phenylenediamine | Yellow |
| 33 | " | 2-Methyl-5-methoxy-1,4-phenylenediamine | Orange |
| 34 | " | 2,5-Dimethoxy-1,4-phenylenediamine | Red-orange |
| 35 | 4,6-Dimethyl-7-aminoquinolone-(2) | 1,4-Phenylenediamine | Yellow |
| 36 | 4,6 Dimethyl-7-aminoquinolone-(2) | 2-Methyl-5-chloro-1,4-phenylenediamine | Yellow |
| 37 | 4,8-Dimethyl-7-aminoquinolone-(2) | 1,4-Phenylenediamine | Yellow |

-continued

| No. | I<br>Diazo component | II<br>Bis-acetoacetyl compound of | III |
|---|---|---|---|
| 38 | " | 2-Chloro-5-methyl-1,4-phenylenediamine | Yellow |
| 39 | " | 2-Chloro-5-methoxy-1,4-phenylenediamine | Orange-yellow |
| 40 | 4-Methyl-6-methoxy-7-aminoquinolone-(2) | 1,4-Phenylenediamine | Yellow |
| 41 | " | 2-Chloro-5-methyl-1,4-phenylenediamine | Yellow |
| 42 | " | 2-Chloro-5-methoxy-1,4-phenylenediamine | Yellow |
| 43 | 4-Methyl-6-phenoxy-7-aminoquinolone-(2) | 1,4-Phenylenediamine | Green-yellow |
| 44 | " | 2-Methoxy-1,4-phenylenediamine | Yellow |
| 45 | " | 2-Chloro-1,4-phenylenediamine | Green-yellow |
| 46 | " | 1,5-Diaminonaphthalene | Yellow |
| 47 | " | 2,5-Dimethyl-1,4-phenylenediamine | Yellow |
| 48 | " | 2,5-Dichloro-1,4-phenylenediamine | Green-yellow |
| 49 | " | 2-Chloro-5-methyl-1,4-phenylenediamine | Yellow |
| 50 | " | 2-Chloro-5-methoxy-1,4-phenylenediamine | Yellow |
| 51 | " | 2-Methyl-5-methoxy-1,4-phenylenediamine | Orange |
| 52 | " | 2,5-Dimethoxy-1,4-phenylenediamine | Orange |
| 53 | " | 2,5-Diethoxy-1,4-phenylene-diamine | Brown-orange |
| 54 | 4-Methyl-6-chloro-7-aminoquinolone-(2) | 1,4-Phenylenediamine | Yellow |
| 55 | " | 2-Methoxy-1,4-phenylenediamine | Yellow |
| 56 | " | 2-Chloro-1,4-phenylenediamine | Yellow |
| 57 | " | 2,5-Dichloro-1,4-phenylenediamine | Green-yellow |
| 58 | " | 2-Chloro-5-methyl-1,4-phenylenediamine | Yellow |
| 59 | 4-Methyl-8-chloro-7-aminoquinolone-(2) | 1,4-Phenylenediamine | Yellow |
| 60 | " | 2,5-Dimethyl-1,4-phenylenediamine | Orange |
| 61 | " | 2,5-Dichloro-1,4-phenylenediamine | Green-yellow |
| 62 | " | 2-Chloro-5-methyl-1,4-phenylenediamine | Orange |
| 63 | " | 2,5-Diethoxy-1,4-phenylenediamine | Red-orange |
| 64 | 5-Amino-benzimidazolone | 1,4-Phenylenediamine | Yellow |
| 65 | " | 2-Chloro-5-methyl-1,4-phenylenediamine | Yellow |
| 66 | 5-Amino-6-methyl-benzimidazolone | 1,4-Phenylenediamine | Orange |
| 67 | " | 2-Chloro-5-methyl-1,4-phenylenediamine | Yellow-orange |
| 68 | " | 2-Chloro-5-methoxy-1,4-phenylenediamine | Orange |
| 69 | 5-Amino-6-methoxy-benzimidazolone | 1,4-Phenylenediamine | Orange-red |
| 70 | " | 2-Chloro-5-methyl-1,4-phenylenediamine | Red-orange |
| 71 | 5-Amino-6-ethoxy-benzimidazolone | 2-Chloro-5-methyl-1,4-phenylenediamine | Red-orange |
| 72 | 5-Amino-6-ethoxy-benzimidazolone | 2-Chloro-5-methoxy-1,4-phenylenediamine | red-orange |
| 73 | 5-Amino-6-chloro-benzimidazolone | 1,4-Phenylenediamine | Yellow |
| 74 | " | 2-Methoxy-1,4-phenylenediamine | Yellow |
| 75 | " | 2-Chloro-1,4-phenylenediamine | Green-yellow |
| 76 | " | 2,5-Dimethyl-1,4-phenylenediamine | Yellow-orange |
| 77 | " | 2,5-Dichloro-1,4-phenylenediamine | Yellow |
| 78 | " | 2-Chloro-5-methyl-1,4-phenylenediamine | Yellow |
| 79 | " | 2-Chloro-5-methoxy-1,4-phenylenediamine | Orange-yellow |
| 80 | 1-Methyl-5-amino-benzimidazolone | 1,4-Phenylenediamine | Yellow |
| 81 | 1-Ethyl-5-amino-benzimidazolone | " | Green-yellow |
| 82 | " | 2-Chloro-5-methyl-1,4-phenylenediamine | Yellow |
| 83 | " | 2-Chloro-5-methoxy-1,4-phenylenediamine | Yellow |
| 84 | 1-Isopropyl-5-amino-benzimidazolone | 1,4-Phenylenediamine | Green-yellow |
| 85 | " | 2-Chloro-5-methyl-1,4-phenylenediamine | Yellow |
| 86 | " | 2-Chloro-5-methoxy-1,4-phenylenediamine | Orange-yellow |
| 87 | 1-n-Butyl-5-amino-benzimidazolone | 1,4-Phenylenediamine | Green-yellow |
| 88 | " | 2-Chloro-5-methyl-1,4-phenylenediamine | Yellow |
| 89 | " | 2-Chloro-5-methoxy-1,4-phenylenediamine | Orange-yellow |
| 90 | 1-Cyclohexyl-5-amino-benzimidazolone | 1,4-Phenylenediamine | Green-yellow |
| 91 | " | " | Green-yellow |
| 92 | " | 2-Chloro-5-methoxy-1,4-phenylenediamine | Yellow |
| 93 | 1-Phenyl-5-amino-benzimidazolone | 1,4-Phenylenediamine | Green-yellow |
| 94 | " | 2-Chloro-5-methyl-1,4-phenylenediamine | Green-yellow |
| 95 | " | 2-Chloro-5-methoxy-1,4-phenylenediamine | Green-yellow |
| 96 | 1-(3'-Chlorophenyl)-5-aminobenzimidazolone | 1,4-Phenylenediamine | Yellow |
| 97 | " | 2-Methoxy-1,4-phenylenediamine | Yellow |
| 98 | " | 2,5-Dimethyl-1,4-phenylenediamine | Orange |
| 99 | " | 2,5-Dichloro-1,4-phenylenediamine | Green-yellow |
| 100 | " | 2-Chloro-5-methyl-1,4-phenylenediamine | Yellow |
| 101 | " | 2-Chloro-5-methoxy-1,4-phenylenediamine | Yellow |
| 102 | 1-(4'-Methylphenyl)-5-aminobenzimidazolone | 1,4-Phenylenediamine | Green-yellow |
| 103 | " | 2-Chloro-5-methyl-1,4-phenylenediamine | Green-yellow |
| 104 | " | 2-Chloro-5-methoxy-1,4-phenylenediamine | Yellow |
| 105 | 6-Aminoquinazoline-dione-(2,4) | 2-Chloro-5-methyl-1,4-phenylenediamine | Yellow |
| 106 | 7-Aminoquinazoline-dione-(2,4) | 2-Chloro-5-methyl-1,4-phenylenediamine | Yellow |
| 107 | " | 2-Chloro-5-methoxy-1,4-phenylenediamine | Orange-yellow |
| 108 | 6-Aminoquinazolone-(4) | 2-Chloro-5-methyl-1,4-phenylenediamine | Yellow |
| 109 | " | 2-Chloro-5-methoxy-1,4-phenylenediamine | Yellow |
| 110 | 7-Aminoquinazolone-(4) | 1,4-Phenylenediamine | Green-yellow |
| 111 | " | 2-Chloro-5-methyl-1,4-phenylenediamine | Yellow |
| 112 | 5-Amino-6-chloroquinazolone-(4) | " | Green-yellow |
| 113 | " | 2-Chloro-5-methoxy-1,4-phenylenediamine | Orange |
| 114 | 2-(3'-Aminophenyl)-quinazolone-(4) | 2-Chloro-5-methyl-1,4-phenylenediamine | Green-yellow |
| 115 | " | 2-Chloro-5-methoxy-1,4-phenylenediamine | Green-yellow |
| 116 | 2-(4'-Aminophenyl)-quinazolone-(4) | 2-Chloro-5-methyl-1,4-phenylenediamine | Yellow |
| 117 | 2-(3'-Chloro-4'-aminophenyl)-quinazolone-(4) | " | Green-yellow |
| 118 | " | 2-Chloro-5-methoxy-1,4-phenylenediamine | Yellow |
| 119 | 2-(3'-Amino-4'-methylphenyl)-quinazolone-(4) | 2-Chloro-5-methyl-1,4-phenylenediamine | Green-yellow |
| 120 | " | 2-Chloro-5-methoxy-1,4-phenylenediamine | Green-yellow |
| 121 | 2-(3'-Amino-4'-methoxyphenyl)-quinazolone-(4) | 2-Chloro-5-methyl-1,4-phenylenediamine | Green-yellow |
| 122 | 2-(3'-Amino-4'-methoxyphenyl)- | 2-Chloro-5-methoxy-1,4-phenylenediamine | Green-yellow |

-continued

| No. | I<br>Diazo component | II<br>Bis-acetoacetyl compound of | III |
|---|---|---|---|
| 123 | 6-(3'-Amino-4'-methoxybenzoylamino)-quinazolone-(4) | 2-Chloro-5-methyl-1,4-phenylenediamine | Green-yellow |
| 124 | " | 2-Chloro-5-methoxy-1,4-phenylenediamine | Yellow |
| 125 | 7-Aminophenmorpholone-(3) | 1,4-Phenylenediamine | Yellow |
| 126 | " | 2-Chloro-5-methoxy-1,4-phenylenediamine | Yellow |
| 127 | 6-Methyl-7-aminophenmorpholone-(3) | " | Orange |
| 128 | " | 2,5-Dimethoxy-1,4-phenylenediamine | Red-orange |
| 129 | 6-Methoxy-7-aminophenmorpholone-(3) | 1,4-Phenylenediamine | Orange |
| 130 | " | 2-Chloro-5-methoxy-1,4-phenylenediamine | Red-orange |
| 131 | 6-Nitro-7-aminophenmorpholone-(3) | 2-Chloro-5-methyl-1,4-phenylenediamine | Red-orange |
| 132 | " | 2-Chloro-5-methoxy-1,4-phenylenediamine | Red |
| 133 | 6-Aminophenmorpholone-(3) | " | Green-yellow |
| 134 | 6-Amino-8-chlorophenmorpholone-(3) | 2-Chloro-5-methyl-1,4-phenylenediamine | Yellow |
| 135 | " | 2-Chloro-5-methoxy-1,4-phenylenediamine | Yellow |
| 136 | 6-Aminoquinoxaline-dione-(2,3) | 2-Chloro-5-methyl-1,4-phenylenediamine | Yellow |
| 137 | 4-Aminonapthostyril | " | Red |
| 138 | " | 2-Chloro-5-methoxy-1,4-phenylenediamine | Red |
| 139 | 3-Amino-naphthalimide | 2-Chloro-5-methyl-1,4-phenylenediamine | Yellow |

EXAMPLE 140

0.6 g of the pigment manufactured according to Example 1 is mixed with 67 g of polyvinyl chloride, 33 g of dioctyl phthalate, 2 g of dibutyl-tin dilaurate and 2 g of titanium dioxide and the mixture is converted to a thin sheet on a roll mill over the course of 15 minutes at 160°C. The yellow colouration thus produced is deep, and fast to migration and to light.

EXAMPLE 141

1.00 g of the pigment manufactured according to Example 1 is finely ground with 4.00 g of a printing varnish composed of 29.4% of linseed oil/stand oil (300 poise), 67.2% of linseed oil/stand oil (20 poise), 2.1% of cobalt octoate (8% Co) and 1.3% of lead octoate (24% Pb) on an Engelsmann grinder and the mixture is then printed by means of a block, using the letterpress process, onto art printing paper at the rate of 1 g/m². A deep, pure orange-tinged yellow shade of good transparency and good gloss is obtained. In three-colour or four-colour printing, very brilliant green shades can be produced by overprinting on blue.

The pigment is also suitable for other printing processes, such as gravure printing, offset printing and flexographic printing and here again gives very good results.

EXAMPLE 142

15 g of a collodion cotton containing 35% of butanol, 15 g of a phthalate resin modified with castor oil, 15 g of a 70% strength solution of a urea lacquer resin in butanol, 20 g of butyl acetate, 10 g of glycol monoethyl ether, 20 g of toluene and 5 g of alcohol are converted to a lacquer. The latter is then pigmented, and ground, with 2 g of the colorant of Example 1 and 2 g of titanium dioxide (rutile). After spraying onto cardboard, and drying the lacquer, a yellow coating of very good fastness to light, overlacquering and weathering results.

EXAMPLE 143

1 g of the colorant according to Example 1 and 5 g of titanium dioxide are added to 100 g of a stoving lacquer which consists of 58.5 g of a 60% strength solution of a coconut alkyd resin in xylene, 23 g of a 65% strength solution of a melamine lacquer resin in butanol, 17 g of xylene and 1.5 g of butanol. The mixture is ground for 48 hours in a ball mill and the lacquer pigmented in this way is sprayed onto a cleaned metal surface. After stoving at 120°C, a reddish-tinged yellow colouration of good fastness to light, overlacquering and weathering results.

What we claim is:

1. A disazo pigment of the formula

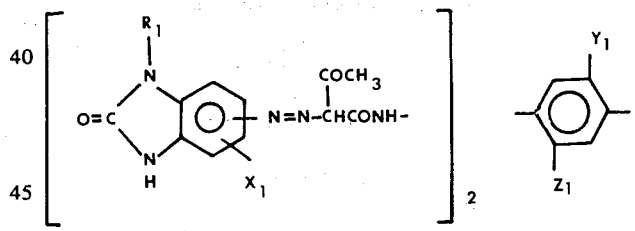

wherein $R_1$ is hydrogen, alkyl containing 1–4 carbon atoms, cycloalkyl containing 5–6 carbon atoms, phenyl, phenyl substituted by chloro, bromo, alkyl containing 1–4 carbon atoms, or alkoxy containing 1–4 carbon atoms; $X_1$ is hydrogen, chloro, bromo, alkyl containing 1–4 carbon atoms, alkoxy containing 1–4 carbon atoms or phenoxy; and $Y_1$ and $Z_1$ are hydrogen, chloro, bromo, alkyl containing 1–4 carbon atoms, or alkoxy containing 1–4 carbon atoms.

* * * * *